(12) United States Patent
Kanega et al.

(10) Patent No.: US 8,357,757 B2
(45) Date of Patent: *Jan. 22, 2013

(54) FLUORINE-CONTAINING ALLOYED COPOLYMER

(75) Inventors: Jun Kanega, Ibaraki (JP); Takashi Obara, Ibaraki (JP); Katsumi Suzuki, Ibaraki (JP); Takashi Enokida, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/085,195

(22) PCT Filed: Oct. 23, 2006

(86) PCT No.: PCT/JP2006/321048
§ 371 (c)(1),
(2), (4) Date: May 19, 2008

(87) PCT Pub. No.: WO2007/058051
PCT Pub. Date: May 24, 2007

(65) Prior Publication Data
US 2009/0312473 A1    Dec. 17, 2009

(30) Foreign Application Priority Data
Nov. 17, 2005 (JP) .................. 2005-332654

(51) Int. Cl.
C08L 27/14 (2006.01)
C08F 8/00 (2006.01)
(52) U.S. Cl. .............. 525/199; 525/200; 525/326.3
(58) Field of Classification Search .............. 525/199, 525/200, 326.3
See application file for complete search history.

(56) References Cited

U.S. PATENT DOCUMENTS

| | | | |
|---|---|---|---|
| 4,115,481 A * | 9/1978 | Finlay et al. | 525/199 |
| 5,548,028 A * | 8/1996 | Tabb | 525/194 |
| 5,696,189 A | 12/1997 | Legare | |
| 5,932,673 A * | 8/1999 | Aten et al. | 526/247 |
| 6,160,053 A * | 12/2000 | Enokida et al. | 525/199 |
| 6,310,141 B1 * | 10/2001 | Chen et al. | 525/199 |
| 6,395,834 B1 * | 5/2002 | Albano et al. | 525/199 |
| 6,734,254 B1 * | 5/2004 | Worm et al. | 525/199 |
| 2002/0028886 A1 * | 3/2002 | Abe et al. | 525/326.3 |
| 2004/0214972 A1 * | 10/2004 | Kurihara et al. | 526/246 |

FOREIGN PATENT DOCUMENTS

| | | |
|---|---|---|
| JP | 2000-119468 | 4/2000 |
| JP | 2000-309704 | 11/2000 |
| JP | 2002097329 A * | 4/2002 |
| JP | 2002-173543 | 6/2002 |
| JP | 2003-165802 | 6/2003 |
| JP | 2003-246823 | 9/2003 |
| JP | 2004-131656 | 4/2004 |
| JP | 2004-175855 | 6/2004 |
| JP | 2004-285264 | 10/2004 |
| WO | WO 97/08239 | 3/1997 |
| WO | WO 01/79337 | 10/2001 |
| WO | WO 2004/094527 | 11/2004 |

OTHER PUBLICATIONS

Billmeyer, Jr. Textbook of Polymer Science, 1984, John Wiley & Sons, 3rd edition, p. 470.*
Machine translation of JP 2002-097329 A, retrieved Feb. 1, 2012.*
Machine translation of JP 2003-246823 A, translated Jun. 22, 2012.*

* cited by examiner

*Primary Examiner* — Nicole M Buie-Hatcher
(74) *Attorney, Agent, or Firm* — Brinks Hofer Gilson & Lione

(57) ABSTRACT

A fluorine-containing alloyed copolymer, which comprises a fluorine-containing elastomer copolymer having a fluorine content of not less than 64% by weight, and a resinous tetrafluoroethylene-perfluoro(alkyl vinyl ether) copolymer having an amount of heat of crystal fusion ΔH of not more than 10 J/g, can give crosslinked moldings having a distinguished plasma resistance against both $CF_4$ plasma treatment and $O_2$ plasma treatment, and also a distinguished cracking resistance at the plasma irradiation, and showing necessary normal state physical properties and compression set when used as seals, and capable of providing soft seals of low hardness, and attaining molding at relatively low temperatures.

8 Claims, No Drawings

FLUORINE-CONTAINING ALLOYED COPOLYMER

RELATED APPLICATIONS

The present application is a 35 U.S.C. §371 national stage filing of International Patent Application No. PCT/JP2006/321048, filed Oct. 23, 2006, to which priority is claimed under 35 U.S.C. §120 and through which priority is claimed under 35 U.S.C. §119 to Japanese Priority Patent Application No. 2005-332654, filed Nov. 17, 2005.

TECHNICAL FIELD

The present invention relates to a fluorine-containing alloyed copolymer, and more particularly to a fluorine-containing alloyed copolymer capable of giving crosslinked moldings having a distinguished plasma resistance.

BACKGROUND ART

Processes for producing semiconductors or liquid crystals involve a plasma treatment of silicon wafers in various steps such as CVD step, etching step, ashing step, etc. Particularly, for organic polymer materials used as seals, etc. in the apparatuses for producing semiconductors or liquid crystals, the plasma treatment is carried out under very severe conditions, so almost all of the organic polymer materials inevitably suffer from heavy deterioration during the exposure to the plasma atmosphere.

As to the seals used in the afore-mentioned apparatuses, inorganic compounds, etc. contained as a filler in the seal materials are generated as particles due to deterioration of organic polymer materials by plasma, thereby contaminating the wafer surfaces. Thus, it is necessary to prevent the seal materials exposed to the plasma atmosphere from generation of such inorganic compounds leading to product failure.

It is necessary that the fluorine-containing elastomer so far used as a seal material is further admixed with a reinforcing agent such as carbon black, silica, titanium oxide, etc. as a filler to improve normal state physical properties such as mechanical strength, compression set, etc. and furthermore in the case of polyol vulcanization or amine vulcanization it is necessary to add thereto an acid acceptor such as a metal compound of Mg, Pb, Ca, Al, Zn, or the like as a vulcanization promoter besides the vulcanizing agent. These inorganic fillers turn to be a source for generating the particles. On the other hand, the fluorine-containing elastomers made free from any inorganic filler as a source of generating the particles suffer not only from a failure of attaining the necessary normal state physical properties for the seal materials, but also from deterioration of the kneadability during the kneading.

Even if no such inorganic fillers are used, the deteriorated seal materials per se may turn to be a source for generating the particles, and thus even in the case of organic polymer materials per se for use in the seal materials, it is required reduction in the amount of generated particles, in other words, enhancement of plasma resistance.

It has been so far proposed in view of such backgrounds to reduce the amount of an inorganic filler to be used to suppress the particle generation and to use PTFE powder as a filler, etc. instead. The proposed filler indeed has a distinguished $CF_4$ plasma resistance, but the $O_2$ plasma resistance is not satisfactory, and thus has not yet satisfied the requirements imposed for use in the apparatuses for producing semiconductors or liquid crystals. Various plasma-resistant seal materials so far proposed for such use are as follows:

Patent Literature 1: JP-A-2000-119468
Patent Literature 2: JP-A-2002-173543
Patent Literature 3: JP-A-2004-131656

It has been still now required in view of a demand for further upsizing of silicon wafers and finer wiring patterns to develop seal materials not only capable of withstanding more severe plasma treatment conditions, but also having a distinguished plasma resistance, irrespective of plasma gas species. Furthermore, improvement of not only reduction in weight as a basic measure of plasma resistance, but also cracking resistance during the plasma irradiation as another basic measure of seal life has been newly required.

DISCLOSURE OF THE INVENTION

Problem to be Solved by the Invention

An object of the present invention is to provide a fluorine-containing alloyed copolymer capable of giving crosslinked moldings having a distinguished plasma resistance in both of $CF_4$ and $O_2$ plasma treatments, and a distinguished cracking resistance against plasma irradiation.

Means for Solving the Problem

The object of the present invention can be attained by a fluorine-containing alloyed copolymer, which comprises a fluorine-containing elastomer copolymer having a fluorine content of not less than 64% by weight, and a resinous tetrafluoroethylene-perfluoro(alkyl vinyl ether) copolymer having an amount of heat of crystal fusion $\Delta H$ of not more than 10 J/g, as contained.

Effect of the Invention

The present fluorine-containing alloyed copolymer can give crosslinked moldings having a distinguished plasma resistance against both of $CF_4$ plasma treatment and $O_2$ plasma treatment, and also a distinguished cracking resistance against plasma irradiation, and showing necessary normal state physical properties and compression set when used as seals. Furthermore, the crosslinked moldings are so soft that a low hardness can be obtained, when used as seals. Molding can be also carried out at relatively low temperatures. The crosslinked moldings having such characteristics as mentioned above can be used suitably as parts of apparatuses for producing semiconductors or liquid crystals, for example, seals, conveyer rolls, etc.

BEST MODES FOR CARRYING OUT THE INVENTION

Fluorine-containing elastomer copolymer for use as one member of the fluorine-containing alloyed copolymer has a fluorine content of not less than 64% by weight, preferably 67-73% by weight, on the basis of the fluorine-containing elastomer copolymer from the viewpoint of compatibility with a resinous fluorine-containing copolymer as will be hereinafter described. When the fluorine content exceeds 74% by weight, a polyfunctional unsaturated compound for use as a cocrosslinking agent will be hard to disperse. The fluorine-containing elastomer for use in the present invention includes even general-purpose tetrafluoroethylene-vinylidene fluoride-hexafluoropropene terpolymers, but preferably vinylidene fluoride [VdF]-tetrafluoroethylene [TFE]- perfluoro(methyl vinyl ether) [FMVE] terpolymer or tetrafluoroethylene [TFE]-perfluoro(methyl vinyl ether) [FMVE] copolymer.

In the case of the VdF-TFE-FMVE terpolymer to make a fluorine content of 64% by weight or more, including such a crosslinking site-formable monomer as will be hereinafter described, when used, those obtained by polymerization in a proportion in % by mole of VdF:TFE:FMVE=10-77:10-80: 10-50, preferably 13-75:13-76:11-45, can be used. Generally, when the VdF component is increased in the copolymer, the fluorine content will be decreased, whereas, when the TFE component and FMVE component are increased, the fluorine content will be increased. Thus, copolymers having the above-defined fluorine content can be formed by adjusting a copolymerization proportion of the three copolymerization components. Total amount of the three components excluding the crosslinking site-formable monomer will be 95-99.95% by mole, preferably 96-99.9% by mole.

In the case of TFE-FMVE copolymers including a crosslinking site-formable monomer as will be hereinafter described, when used, those obtained by copolymerization in a proportion in % by mole of TFE:FMVE=50-80:20:50, preferably 55-75:25-45 can be used. Total amount of the two components excluding the crosslinking site-formable monomer will be 95-99.95% by mole, preferably 96-99.9% by mole.

Resinous tetrafluoroethylene-perfluoro(alkyl vinyl ether) copolymer for use as another component of the fluorine-containing alloyed copolymer has an amount of heat of crystal fusion $\Delta H$ of not more than 10 J/g, and preferably a crystal melting point of not higher than 200° C.

Tetrafluoroethylene-perfluoro(alkyl vinyl ether) copolymer for use herein has a tetrafluoroethylene [TFE] proportion of not more than 95% by mole, preferably 94-60% by mole. Perfluoro(alkyl vinyl ether) for use herein includes generally perfluoro(methyl vinyl ether) [FMVE], perfluoro(ethyl vinyl ether) [FEVE], and perfluoro(propyl vinyl ether) (FPVE), and in a broad sense can include perfluoro(alkoxyalkyl vinyl ether) represented by the following general formula:

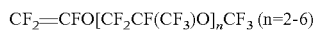

$CF_2=CFO[CF_2CF(CF_3)O]_nCF_3$ (n=2-6)

Preferable resinous fluorine-containing copolymer is a TFE-FEVE-FPVE terpolymer, where the total content of FEVE and FPVE is 5% by mole or more, preferably 6-40% by mole, and a copolymer composition ratio of FEVE/FPVE is 0.8-2.0, preferably 0.9-1.8.
Patent Literature 4: JP-A-2003-246823

To improve the normal state physical properties and the compression set, iodine atom- and/or bromine atom-containing fluorinated monomers can be further copolymerized. In place of or together with introduction of iodine atoms and/or bromine atoms into copolymer side chains by the fluorinated monomers, iodine atoms and/or bromine atoms can be added to the copolymer terminals.

In the case of introduction of iodine atoms and/or bromine atoms as side chains of the fluorine-containing copolymers, copolymers copolymerized with such a compound as perfluoro(2-bromoethyl vinyl ether), 3,3,4,4-tetrafluoro-4-bromo-1-butene, 2-bromo-1,1-difluoroethylene, bromotrifluoroethylene, perfluoro(2-iodoethyl vinyl ether), iodotrifluoroethylene, etc. are exemplified.

In the case of introduction of iodine atoms and/or bromine atoms to the terminals of fluorine-containing copolymer, derived from a fluoroalkylene compound halogenated at both terminals, represented by the following general formula:

$X_1CnF_{2n}X_2$ (where X1=F, Br, or I; $X_2$=Br or I, and n=1-12) can be used. From the viewpoint of reactivity or handling balance, it is preferable to use iodine atom and/or bromine atom-containing copolymers derived from the compounds having n=1-6, such as 1-bromoperfluoroethane, 1-bromoperfluoropropane, 1-bromoperfluorobutane, 1-bromoperfluoropentane, 1-bromoperfluorohexane, 1-iodoperfluoroethane, 1-iodoperfluoropropane, 1-iodoperfluorobutane, 1-iodoperfluoropentane, 1-iodoperfluorohexane, etc.

Crosslinking-sites can be introduced to the terminals of the fluorine-containing copolymer by selecting Br and/or I for $X_1$ and $X_2$ of the compound of the afore-mentioned general formula. Such compounds include, for example, 1-bromo-2-iodotetrafluoroethane, 1-bromo-3-iodoperfluoropropane, 1-bromo-4-iodoperfluorobutane, 2-bromo-3-iodoperfluorobutane, monobromomonoiodoperfluoropentane, monobromomonoiodoperfluoro-n-hexane, 1,2-dibromoperfluoroethane, 1,3-dibromoperfluoropropane, 1,4-dibromoperfluorobutane, 1,5-dibromoperfluoropentane, 1,6-dibromoperfluorohexane, 1,2-diiodoperfluoroethane, 1,3-diiodoperfluoropropane, 1,4-diiodoperfluorobutane, 1,5-diiodoperfluoropentane, 1,6-diiodoperfluorohexane, etc. These compounds can be used also as a chain transfer agent. Methanol, ethanol, isopropanol, ethyl acetate, acetone, methane, etc. can be also used as a chain transfer agent.

The resinous fluorine-containing copolymer having an amount of heat of crystal fusion $\Delta H$ of not more than 10 J/g, preferably not more than 8 J/g, particularly preferably non-detected $\Delta H$, can be used. Above $\Delta H$ of more than 10 J/g, improvement effects on the normal state physical properties of crosslinked molding will be less significant, and the crosslinked moldings, when used as a seal, will have a higher hardness, so unless the fastening pressure on the seal is increased when assembled into apparatuses for producing semiconductors, a high sealability will be no more attained. It is desirable to use such a resinous fluorine-containing copolymer having a crystal melting point of not higher than 200° C., preferably not higher than 190° C., or to use an amorphous copolymer. Above a crystal melting point of higher than 200° C., the similar tendency to that in the case of higher $\Delta H$ will be observed.

Resinous fluorine-containing copolymer and fluorine-containing elastomer copolymer can be prepared by any one of polymerization processes such as emulsion polymerization process, solution polymerization process, etc., respectively. From the viewpoint of production cost, thermally yellowing resistance and normal state physical properties, it is desirable to heat a halogenated fluoroalkyl compound, or 2-perfluoroalkylethanethiol, and a polymerization initiator capable of transferring radicals thereto, or an oxide in an aqueous medium at 40°-100° C., and then charge a fluorine-containing monomers into the reaction system, thereby conducting copolymerization reaction. In progress of the copolymerization reaction, it is desirable to uniformly add the monomer mixture of constant composition ratio thereto portionwise.
Patent Literature 5: JP-A-2003-165802
Patent Literature 6: JP-A-2004-175855

Fluorine-containing alloyed copolymer can be prepared by mixing and kneading fluorine-containing elastomer copolymer and resinous fluorine-containing copolymer, each as isolated in a solid state, through mixing rolls, a kneader, a Banbury mixer, or the like, but preferably by the so-called latex blend method to attain uniform dispersion of these two. This method is also costly advantageous.

The fluorine-containing elastomer copolymer and the resinous fluorine-containing copolymer are blended together in a blend proportion of the former to the latter in % by weight of 95-55:5-45, preferably 90-60:10-40, to provide a fluorine-containing alloyed copolymer. When the resinous fluorine-containing copolymer is in a blend proportion of less than 5% by weight, improvement effects of the fluorine-containing elastomer copolymer on both of the plasma resistance and the normal state physical properties will be less significant, whereas in a blend proportion of more than 45% by weight, kneadability at the blending will be deteriorated.

The fluorine-containing alloyed copolymer can be coagulated from the blended latex by a freeze coagulation method, a precipitation method based on excessive stirring, a coagulation method of dropping the blended latex into an aqueous solution of a salt such as $CaCl_2$, NaCl, potash alum, etc., or into a water-soluble alcohol-based solvent such as methanol, ethanol, etc., or into a ketone-based solvent such as acetone, methyl ethyl ketone, methyl isobutyl ketone, etc., or the like. To much more reduce the amount of impurities contained in the fluorine-containing alloyed copolymer, it is preferable to use the freeze coagulation method, the coagulation method of dropping it into the water-soluble organic solvent, a method using a cationic surfactant as a coagulant together with a water-soluble organic solvent.

Patent Literature 7: JP-A-2004-285264

The fluorine-containing alloyed copolymer can be crosslinked by a peroxide as a radical initiator. To enhance the purity of the fluorine-containing alloyed copolymer, it is not preferable to use an inorganic peroxide. An organic peroxide can be used in a proportion of 0.01-10 parts by weight, preferably 0.01-5 parts by weight, on the basis of 100 parts by weight of the fluorine-containing alloyed copolymer. The organic peroxide for use herein includes at least one of dicumyl peroxide, 2,4-dichlorobenzoyl peroxide, di-t-butyl peroxide, t-butyl cumyl peroxide, benzoyl peroxide, 2,5-dimethyl-2,5-di(t-butylperoxy)hexane, 2,5-dimethyl-2,5-di(benzoylperoxy)-hexane, 2,5-dimethyl-2,5-di(t-butylperoxy)hexine-3, t-butylperoxyisopropyl carbonate, p-chlorobenzoyl peroxide, t-butyl perbenzoate, etc., among which it is preferable from the viewpoint of half-life temperature and crosslinking temperature to use 2,5-dimethyl-2,5-di(t-butylperoxy)hexane.

In the organic peroxide crosslinking, it is desirable to use 0.1-20 parts by weight, preferably 1-15 parts by weight, of a polyfunctional unsaturated compound as a cocrosslinking agent on the basis of 100 parts by weight of the fluorine-containing alloyed copolymer. The cocrosslinking agent for use herein includes at least one of ethyleneglycol di(meth)acrylate, 1,3-butyleneglycol di(meth)acrylate, 1,4-butyleneglycol di(meth)acrylate, 1,6-hexamethyleneglycol di(meth)acrylate, polyethyleneglycol di(meth)-acrylate, trimethylolpropane tri(meth)acrylate, pentaerythritol triacrylate, 3-chloro-2-hydroxypropane (meth)acrylate, oligoester acrylate, triallyl isocyanurate, triallyl cyanurate, triallyl trimellitate, diallyl phthalate, diallyl chloreneduate, divinylbenzene, etc. It is preferable from the viewpoint of compatibility with the fluorine-containing alloyed copolymer to use triallyl isocyanurate, triallyl cyanurate, triallyl trimellitate, etc.

From the viewpoint of roll kneadability, the organic peroxide and the cocrosslinking agent can be used as diluted with 1-50% by weight of silica.

A crosslinkable composition, which comprises the foregoing components, can be prepared by blending the fluorine-containing alloyed copolymer with the organic peroxide radical initiator, and the cocrosslinking agent successively in this order, and mixing and kneading the blend through mixing rolls, a kneader, a Banbury mixer, etc. The kneaded product is then heated at about 100° to about 250° C. for about 1 to about 60 minutes in a press molding machine, etc. to conduct primary vulcanization, and then heated at about 100° to about 250° C. for about 1 to about 50 hours to conduct secondary vulcanization, thereby effecting vulcanization molding in desired shapes.

EXAMPLES

The present invention will be described in detail below, referring to Examples.

Reference Example 1

| | |
|---|---|
| Deionized water | 60 kg |
| Ammonium perfluorooctanoate | 720 g |
| 25 wt. % ammonia water | 28 g |
| Ammonium persulfate | 8 g |
| Sodium hydrogen sulfite | 1 g |

The afore-mentioned components were charged into a SUS 316 autoclave having a net capacity of 100 L, provided with a stirrer, and after thorough deaeration, the following component was charged therein, and heated to 80° C., and kept at that temperature for 30 minutes:

$ICF_2CF_2Br$[IBrTFE] chain transfer agent 93 g

Then, the following components were successively charged therein and the internal pressure of the autoclave was made 0.85 MPa·G to initiate polymerization reaction:

| | |
|---|---|
| Tetrafluoroethylene [TFE] | 1.50 kg(56.7 mol. %) |
| Perfluoro(methyl vinyl ether) [FMVE] | 1.60 kg(36.5 mol. %) |
| 2-bromotetrafluoroethoxytrifluoroethylene [FBrVE] | 50 g(6.8 mol. %) |

When the internal pressure of the autoclave was lowered to 0.75 MPa·G in progress of polymerization reaction, pressure-lowering or elevating operations were carried out in a constant molar ratio of portionwise added components, i.e. TFE/FMVE/FBrVE=64/35/1 between internal pressures of 0.75 and 0.85 MPa·G until the total amount of portionwise added monomers reached to 19.5 kg. Then, aging was carried out until the internal pressure reached to 0.5 MPa·G to complete the polymerization reaction.

Emulsion (aqueous latex of fluorine-containing elastomer) taken out of the autoclave had a concentration of solid matters of 30 wt. %, and a portion of the emulsion was sampled and subjected to coagulation in an aqueous 1 wt. % $CaCl_2$ solution, filtration, washing with deionized water and drying successively, whereby white, fluorine-containing elastomer copolymer (F content: 72 wt. %) was obtained.

Reference Example 2

In Reference Example 1, the following components were charged into the autoclave, successively, and the internal pressure of the autoclave was made 1.0 MPa·G to initiate the polymerization reaction:

| | |
|---|---|
| Vinylidene fluoride [VdF] | 0.28 kg(14.1 mol. %) |
| Tetrafluoroethylene [TFE] | 1.62 kg(52.3 mol. %) |
| Perfluoro(methyl vinyl ether) [FMVE] | 1.70 kg(33.0 mol. %) |

| | |
|---|---|
| 2-bromotetrafluoroethoxytrifluoroethylene [FBrVE] | 50 g(0.6 mol. %) |

When the internal pressure of the autoclave was lowered to 0.9 MPa·G in progress of polymerization reaction, pressure-lowering or elevating operations were carried out in a constant molar ratio of portionwise-added components, i.e. VdF/TFE/FMVE/FBrVE=13/51/35/1 between internal pressures of 0.9 and 1.0 MPa·G until the total amount of portionwise-added monomers reached to 14 kg. Then, aging was carried out until the internal pressure reached to 0.4 MPa·G to complete the polymerization reaction. Emulsion taken out of the autoclave had a concentration of solid matters of 34 wt. %. Then, white fluorine-containing elastomer copolymer (F content: 71 wt. %) was likewise obtained.

Reference Example 3

In Reference Example 1, the following components were charged into the autoclave successively, and the internal pressure of the autoclave was made 1.5 MPa·G to initiate the polymerization reaction:

| | |
|---|---|
| Vinylidene fluoride [VdF] | 0.81 kg(34.8 mol. %) |
| Tetrafluoroethylene [TFE] | 1.61 kg(46.5 mol. %) |
| Perfluoro(methyl vinyl ether) [FMVE] | 1.10 kg(18.2 mol. %) |
| 2-bromotetrafluoroethoxytrifluoroethylene [FBrVE] | 50 g(0.5 mol. %) |

When the internal pressure of the autoclave was lowered to 1.4 MPa·G in progress of polymerization reaction, pressure-lowering or -elevating operations were carried out in a constant molar ratio of portionwise-added components, i.e. VdF/TFE/FMVE/FBrVE=29/37/33/1 between pressures of 1.4 and 1.5 MPa·G until the total amount of portionwise-added monomers reached to 14 kg. Then, aging was carried out until the internal pressure reached to 0.7 MPa·G to complete the polymerization reaction. Emulsion taken out of the autoclave had a concentration of solid matters of 25 wt. %. Then, white fluorine-containing elastomer copolymer (F content: 69 wt. %) was likewise obtained.

Reference Example 4

In Reference Example 1, the following components were charged into the autoclave successively, and the internal pressure of the autoclave was made 3.0 MPa·G to initiate the polymerization reaction:

| | |
|---|---|
| Vinylidene fluoride [VdF] | 3.45 kg(65.5 mol. %) |
| Tetrafluoroethylene [TFE] | 0.95 kg(11.6 mol. %) |
| Perfluoro(methyl vinyl ether) [FMVE] | 3.10 kg(22.7 mol. %) |
| 2-bromotetrafluoroethoxyfluoroethylene [FBrVE] | 50 g(0.2 mol. %) |

When the internal pressure of the autoclave was lowered to 2.9 MPa·G in progress of polymerization reaction, pressure-lowering or -elevating operations were carried out in a constant molar of portionwise-added components, i.e. VdF/TFE/FMVE/FBrVE=68/12/19/1 between internal pressures of 2.9 and 3.0 MPa·G until the total amount of portionwise added monomers reached to 24 kg. Then, aging was carried out until the internal pressure reached to 0.5 MPa·G to complete the polymerization reaction. Emulsion taken out of the autoclave had a concentration of solid matters of 33 wt. %. Then, white fluorine-containing elastomer copolymer (F content: 65 wt. %) was likewise obtained.

Copolymer composition proportions and characteristics of the fluorine-containing elastomers obtained in the foregoing Reference Examples 1 to 4 are shown in the following Table 1.

Comonomer Composition Proportion: Determined by Infrared Absorption Spectra and $^{19}$F NMR Glass transition point (Tg): determined with DSC model 220 available from Seiko Instrument Co., according to a temperature program of heating a sample from −100° C. to 100° C. at a temperature-elevating rate of 10° C./min., then cooling it to −100° C. at a temperature-lowering rate of 10° C./min., and heating it again to 100° C. at a temperature-elevating rate of 10° C./min.

Intrinsic viscosity: determined by an Ube-Rhode viscosimeter, using solutions of a fluorine-containing copolymer in FC-77 solvent (Reference Examples 1 to 3) or acetone solvent (Reference Example 4) at concentrations of 2 g/L, 4 g/L, and 10 g/L, where an intrinsic viscosity is obtained from intercepts of a dropping time at 35° C. to a concentration Melt viscosity: determined by a melt indexer available from Toyo Seiki Manufacturing Co., by placing a fluorine-containing copolymer into a cylinder, 9.5 mm in inner diameter, followed by extrusion through an orifice, 2.095 mm in inner diameter and 8.00 mm in length, under a piston load of 5 kg to measure amounts of the extrudate at a specific temperature Mooney viscosity: determined at 121° C. according to JIS K6300 corresponding to ASTM D1646

TABLE 1

| Item of determination | Ref. Ex. 1 | Ref. Ex. 2 | Ref. Ex. 3 | Ref. Ex. 4 |
|---|---|---|---|---|
| Fluorine-containing elastomer composition proportion | | | | |
| TFE (mol. %) | 64 | 52 | 40 | 12 |
| FMVE (mol. %) | 35 | 33 | 30 | 17 |
| VdF (mol. %) | — | 14 | 29 | 70 |
| FBrVE (mol. %) | 1 | 1 | 1 | 1 |
| Fluorine-containing elastomer characteristics | | | | |
| Glass transition point (° C.) | −5 | −11 | −16 | −30 |
| Intrinsic viscosity (dl/g) | 0.40 | 0.34 | 0.50 | 1.11 |
| Melt viscosity (g/10 min.) | 32 (180° C.) | 70 (180° C.) | 3 (210° C.) | 5 (260° C.) |

TABLE 1-continued

| Item of determination | Ref. Ex. 1 | Ref. Ex. 2 | Ref. Ex. 3 | Ref. Ex. 4 |
|---|---|---|---|---|
| Mooney viscosity (—) | 46 | 17 | 81 | 59 |
| Identification mark of fluorine-containing elastomer | I | II | III | IV |

Reference Example 5

| Deionized water | 4850 g |
|---|---|
| $CF_3(CF_2)_2OCF(CF_3)CF_2OCF(CF_3)COONH_4$ | 150 g |
| Sodium hydrogen sulfite | 0.3 g |

The above-mentioned components were charged into a SUS 316 autoclave having a net capacity of 10 L, provided with a stirrer and deaerated to vacuum, and then the autoclave was further subjected to repeated pressure reduction and nitrogen flushing to thoroughly remove oxygen from the autoclave. Then, the following components were charged therein:

| IBrTFE chain transfer agent | 10 g |
|---|---|
| 25 wt. % ammonia water | 5 g |

Then, the following copolymerization monomers were charged therein successively, and the autoclave was heated to 50°, whereby the internal pressure of the autoclave reached to 0.85 MPa·G.

| Tetrafluoroethylene [TFE] | 267 g (62 mol. %) |
|---|---|
| Perfluoro(ethyl vinyl ether) [FEVE] | 171 g (19 mol. %) |
| Perfluoro(propyl vinyl ether) [FPVE] | 211 g (19 mol. %) |

Then, 15 g of ammonium peroxodisulfate in an aqueous 10 wt. % solution was introduced thereto as an initiator by a rating pump to initiate polymerization reaction.

When the internal pressure of the autoclave was lowered to 0.75 MPa·G in progress of polymerization reaction, portionwise addition of TFE up to an internal pressure of 0.85 MPa·G were repeated until the amount of portionwise-added TFE reached to 1462 g. At the same time, other comonomers were portionwise-added thereto in a constant molar ratio of TFE/FEVE/FPVE=73.8/13.3/12.9 according to the amount of portionwise-added TFE. After the portionwise addition, aging was carried out until the internal pressure was no more lowered to complete the polymerization reaction.

Emulsion (aqueous emulsion of resinous fluorine-containing copolymer) taken out of the autoclave had a concentration of solid matters of 38 wt. %, and a portion of the emulsion as sampled was subjected to coagulation in an aqueous 1 wt. % $MgCl_2$ solution, filtration, washing with deionized water, and drying successively, whereby white resinous fluorine-containing copolymer (F content: 73 wt. %) was obtained.

Reference Example 6

In Reference Example 5, 2 g of isopropanol was used in place of IBrTFE, and the amounts of initially charged comonomers were changed to 270 g (64 mol. %) of TFE, 174 g (19 mol. %) of FEVE, and 186 g (17 mol. %) of FPVE, and the comonomers were further added thereto portionwise in a constant molar ratio of TFE/FEVE/FPVE=85.4/7.8/6.8 until the amount of portionwise added TFE reached to 1,900 g.

Reference Example 7

In Reference Example 5, the amount of initially charged comonomers were changed to 270 g (64 mol. %) of TFE, 174 g (19 mol. %) of FEVE, and 186 g (17 mol. %) of FPVE, and the comonomers were further added thereto portionwise in a constant molar ratio of TFE/FEVE/FPVE=89.5/5.3/5.2 until the amount of portionwise-added TFE reached to 2,260 g.

Reference Example 8

In Reference Example 6, the amounts of ammonium perfluorooctanoate as emulsifying agent was changed to 100 g, and the amounts of initially charged copolymerization monomers were changed to 180 g (75 mol. %) of TFE and 160 g (25 mol. %) of FPVE. The comonomers were further added thereto portionwise in a constant molar ratio of TFE/FPVE=98.9/1.1 until the amount of portionwise-added TFE reached to 2,629 g.

Reference Example 9

In Reference Example 6, the amounts of ammonium perfluorooctanoate as emulsifying agent was changed to 100 g, and the amount of initially charged copolymerization monomer was changed to 150 g (100 mol. %) of TFE. TFE was further added thereto portionwise until the amount of portionwise-added TFE reached to 2,500 g.

Comonomer composition proportion and characteristics of resinous fluorine-containing copolymers obtained in the foregoing Reference Examples are given in the following Table 2.

Comonomer Composition Proportion: Determined by the Same Method as Described Before Crystal melting point (Tm) and amount of heat of crystal fusion (ΔH): determined by DSC model 220C commercially available from Seiko Instrument Co., according to a temperature program of heating a sample from 30° to 250° C. at a temperature-elevating rate of 10° C./min., then cooling it to 30° C. at a cooling rate of 10° C./min., and then again heating it to 250° C. at a temperature-elevating rate of 10° C./min., where the apex of endothermic peak is determined as Tm, and the amount of endothermic heat at the endothermic peak as ΔH Melt Viscosity: Determined by the Same Method as Described Before

TABLE 2

| Item of determination | Ref. Ex. 5 | Ref. Ex. 6 | Ref. Ex. 7 | Ref. Ex. 8 | Ref. Ex. 9 |
|---|---|---|---|---|---|
| Resineous fluorine-containing copolymer composition proportion | | | | | |
| TFE (mol. %) | 74 | 85 | 90 | 99 | 100 |
| FEVE (mol. %) | 13 | 8 | 5 | — | — |
| FPVE (mol. %) | 13 | 7 | 5 | 1 | — |
| Resineous fluorine-containing copolymer characteristics | | | | | |
| Crystal melting point Tm (° C.) | non detected | non detected | non detected | 312 | 318 |
| Amount of heat of crystal fusion ΔH (J/g) | non detected | non detected | non detected | 22 | 27 |
| Melt viscosity (g/10 min.) | 26 (160° C.) | 2 (260° C.) | 35 (260° C.) | 1 (320° C.) | 0 (320° C.) |
| Identification mark of resineous fluorine-containing copolymer | A | B | C | D | E |

Examples 1 to 7 and Comparative Examples 1 to 7

Fluorine-containing elastomer copolymer emulsions (1-IV) obtained in Reference Examples 1 to 4, and resinous fluorine-containing copolymer emulsions (A-E) obtained in Reference Examples 5 to 9 were mixed together in ratios of solid matters as given in the following Table 3, with thorough stirring. Then, the resulting aqueous emulsion mixtures were each subjected to coagulation in an aqueous 1 wt. % $CaCl_2$ solution, filtration, washing with deionized water, and drying, successively, to obtain fluorine-containing alloyed copolymers.

TABLE 3

| Ex. No. | Fluorine-containing elastomer copolymer | | Resineous fluorine-containing copolymer | |
|---|---|---|---|---|
| Ex. 1 | I | 80 wt. % | B | 20 wt. % |
| Ex. 2 | I | 90 wt. % | C | 10 wt. % |
| Ex. 3 | III | 80 wt. % | B | 20 wt. % |
| Ex. 4 | III | 70 wt. % | A | 30 wt. % |
| Ex. 5 | IV | 60 wt. % | A | 40 wt. % |
| Ex. 6 | III | 80 wt. % | C | 20 wt. % |
| Ex. 7 | III | 70 wt. % | C | 30 wt. % |
| Comp. Ex. 1 | I | 80 wt. % | D | 20 wt. % |
| Comp. Ex. 2 | III | 80 wt. % | D | 20 wt. % |
| Comp. Ex. 3 | III | 80 wt. % | E | 20 wt. % |
| Comp. Ex. 4 | I | 80 wt. % | E | 20 wt. % |
| Comp. Ex. 5 | I | 100 wt. % | — | — |
| Comp. Ex. 6 | III | 100 wt. % | — | — |
| Comp. Ex. 7 | — | — | B | 100 wt. % |

3.5 parts by weight of triallyl isocyanurate (6.5 parts by weight in Example 3, and 4.0 parts by weight in Comparative Examples 4-6), and 2.0 parts by weight of 2,5-dimethyl-2,5-di(t-butylperoxy)hexane (1.0 part by weight in Examples 2 and 7, and 1.0 part by weight in Comparative Example 2, 0.6 parts by weight in Comparative Examples 4 and 5, and 0.8 parts by weight in Comparative Example 6) were added to 100 parts by weight each of fluorine-containing alloyed copolymers having the aforementioned blend compositions, followed by kneading through rolls. The resulting kneaded products were subjected to primary vulcanization at 180° C. for 6 minutes and then to oven vulcanization (second vulcanization) at 200° C. for 15 hours to mold 2 mm-thick sheets and P-24 O rings by crosslinking molding. In Comparative Example 7, 2 mm-thick sheets were obtained by compression molding and P-24 O rings by injection molding at 260° C., without any addition of these compounding ingredients.

The resulting crosslinked moldings and uncrosslinked compositions were subject to determination and evaluation of the following items, and the results are shown in the following Table 4 (Examples) and Table 5 (Comparative Examples).

Kneadability: As to roll processability, 8-inch rolls are used, where good windability is evaluated as ○, appearance of cracks on selvages of wound sheet as Δ, and poor windability as ×

As to crosslinking moldability, good mold releasability of crosslinked moldings at the primary vulcanization with smooth surfaces of moldings is evaluated as ○, relatively good mold releasability with partly rough surfaces of moldings as Δ, and released moldings having no trace of the original form as ×

Normal State Physical Properties: Determined According to JIS K6253 and K6251, Corresponding to ASTM D412

Compression set: determined according to JIS K6262, corresponding to ASTM D395; using P-24 O rings in 25% compression at 100° C., 175° C. or 200° C. for 70 hours Plasma resistance: determined by a parallel flat plate-type dry etching apparatus with $CF_4$ or $O_2$ as a plasma gas species, where percent weight changes are determined by conducting a plasma irradiation test under such conditions as chamber pressure: 0.1 Pa, gas flow rate: 20 sccm, Rf power: 500 W, electrode height: 120 mm, and irradiation time: 18 hours, and by calculating percent weight reduction before and after the test Crack generation is determined by exposing P-24 O rings in a 12%, 16% or 20% stretched state to plasma irradiation under the same conditions as above, and checking crack generation 18 hours after the plasma irradiation by an optical microscope of 25× power (when the O-ring is broken, the time taken till breaking is checked)

TABLE 4

| Items of determination or evaluation | Ex. 1 | Ex. 2 | Ex. 3 | Ex. 4 | Ex. 5 | Ex. 6 | Ex. 7 |
|---|---|---|---|---|---|---|---|
| Kneadability | | | | | | | |
| Roll processability | ○ | ○ | ○ | ○ | ○ | ○ | ○ |
| Crosslinking moldability | ○ | ○ | ○ | ○ | ○ | ○ | ○ |
| Normal state physical properties | | | | | | | |
| Hardness (Shore A) | 73 | 78 | 76 | 68 | 72 | 78 | 85 |
| 100% modulus (MPa) | 8.0 | 8.5 | 2.4 | 2.9 | 3.5 | 3.6 | 4.6 |
| Tensile strength (MPa) | 16 | 18 | 12.2 | 15.5 | 17.8 | 13.5 | 14.9 |
| Elongation at break (%) | 150 | 150 | 190 | 240 | 240 | 320 | 320 |
| Compression set | | | | | | | |
| 100° C. for 70 hrs (%) | 22 | 25 | 28 | 38 | 43 | 29 | 34 |
| 175° C. for 70 hrs (%) | 19 | 34 | 28 | 23 | 28 | 32 | 39 |
| 200° C. for 70 hrs (%) | 21 | 28 | 35 | 36 | 35 | 44 | 50 |
| Plasma resistance [CF$_4$ gas] | | | | | | | |
| Percent weight change (%) | −0.8 | −0.9 | −0.7 | −0.8 | −1.0 | −0.9 | −0.9 |
| Crack generation | | | | | | | |
| 12% stretched state | none | none | none | none | none | none | none |
| 16% stretched state | none | none | none | none | none | none | none |
| 20% stretched state | none | none | none | none | none | none | none |
| [O$_2$ gas] | | | | | | | |
| Percent weight change (%) | −1.7 | −1.6 | −1.9 | −1.8 | −2.0 | −1.5 | −1.4 |
| Crack generation | | | | | | | |
| 12% stretched state | none | none | none | none | none | none | none |
| 16% stretched state | none | none | none | none | none | none | none |
| 20% stretched state | none | none | none | none | none | none | none |

TABLE 5

| Items of determination or evaluation | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Kneadability | | | | | | | |
| Roll processability | X | Δ | ○ | ○ | X | Δ | — |
| Crosslinking moldability | X | X | Δ | Δ | X | Δ | — |
| Normal state physical properties | | | | | | | |
| Hardness (Shore A) | — | — | 81 | 84 | — | 63 | 92 |
| 100% modulus (MPa) | — | — | 8.7 | 14.6 | — | 1.9 | — |
| Tensile strength (MPa) | — | — | 18 | 19 | — | 19.7 | 31 |
| Elongation at break (%) | — | — | 190 | 120 | — | 410 | 310 |
| Compression set | | | | | | | |
| 100° C. for 70 hrs (%) | — | — | 28 | Compression cracking | — | 56 | 88 |
| 175° C. for 70 hrs (%) | — | — | 27 | Compression cracking | — | 60 | 93 |
| 200° C. for 70 hrs (%) | — | — | 26 | Compression cracking | — | 69 | 98 |
| Plasma resistance [CF$_4$ gas] | | | | | | | |
| Percent weight change (%) | — | — | −5.2 | — | — | −13.5 | −0.1 |
| Crack generation | | | | | | | |
| 12% stretched state | — | — | none | — | — | yes | none |
| 16% stretched state | — | — | none | — | — | yes | none |
| 20% stretched state | — | — | none | — | — | 6 hrs | yes |
| [O$_2$ gas] | | | | | | | |
| Percent weight change (%) | — | — | −7.0 | — | — | −15.3 | −0.1 |
| Crack generation | | | | | | | |
| 12% stretched state | — | — | none | — | — | yes | none |
| 16% stretched state | — | — | yes | — | — | 6 hrs | none |
| 20% stretched state | — | — | yes | — | — | 6 hrs | yes |

The invention claimed is:

1. A fluorine-containing alloyed copolymer, which comprises a fluorine-containing elastomer copolymer consisting of vinylidene fluoride, tetrafluoroethylene and perfluoro(methyl vinyl ether) or consisting of tetrafluoroethylene and perfluoro(methyl vinyl ether), having a fluorine content of not less than 64% by weight, and a resinous fluorine-containing copolymer consisting of tetrafluoroethylene, perfluoro(ethyl vinyl ether) and perfluoro(propyl vinyl ether) having a copolymerization proportion of tetrafluoroethylene of not more than 95 mol. %, and an amount of heat of crystal fusion ΔH being non-detectable, and both the fluorine-containing elastomer copolymer and the resinous fluorine-containing copolymer having iodine and/or bromine atoms derived from $ICF_2CF_2Br$ introduced into copolymer terminals, as blended together.

2. A fluorine-containing alloyed copolymer according to claim 1, wherein the fluorine-containing elastomer copolymer and the resinous fluorine-containing copolymer are blended together in a proportion of the former to the latter of 95-55 wt. % to 5-45 wt. %.

3. A fluorine-containing alloyed copolymer according to claim 1, wherein a fluorine-containing elastomer further copolymerized with a fluorinated monomer containing an iodine atom and/or a bromine atom is used.

4. A crosslinkable composition, which comprises a fluorine-containing alloyed copolymer according to claim 1, and an organic peroxide.

5. A crosslinkable composition according to claim 4, wherein a polyfunctional unsaturated compound is further contained as a cocrosslinking agent.

6. Crosslinked moldings, prepared by crosslinking molding of a crosslinkable composition according to claim 4.

7. Seals or conveyor rolls comprising the crosslinked moldings according to claim 6.

8. Crosslinked moldings according to claim 6, which have a percent weight change of not more than 2 wt. % before and after plasma irradiation with $CF_4$ or $O_2$ as determined under conditions of flow rate: 20 sccm, pressure: 0.1 Pa, Rf power: 500 W, and irradiation time: 18 hours.

* * * * *